United States Patent [19]

Gaspar

[11] Patent Number: 5,532,536
[45] Date of Patent: Jul. 2, 1996

[54] BRUSH HOLDER PLATE FOR A DIRECT CURRENT ELECTRIC COMMUTATING MOTOR AND AN ELECTRIC MOTOR EQUIPPED THEREWITH

[75] Inventor: Arsène Gaspar, Morangis, France

[73] Assignee: Valeo Systems d'Essuyage, Montigny-le-Bretonneux, France

[21] Appl. No.: 267,801

[22] Filed: Jun. 27, 1994

[30]   Foreign Application Priority Data

Jun. 30, 1993 [FR] France ................................. 93 07985

[51] Int. Cl.$^6$ ............................................. H01F 39/38
[52] U.S. Cl. ................................ 310/239; 310/90
[58] Field of Search .............................. 310/238, 239, 310/242, 245–247

[56]   References Cited

U.S. PATENT DOCUMENTS

| | | | |
|---|---|---|---|
| 3,745,393 | 7/1973 | Spors | 310/239 |
| 4,227,104 | 10/1980 | Hamman | 310/90 X |
| 4,559,465 | 12/1985 | Gagneux | 310/242 |
| 4,862,582 | 9/1989 | Henck | 310/90 X |
| 5,041,751 | 8/1991 | Yokozuka | 310/239 |
| 5,221,130 | 6/1993 | Satoh et al. | 310/239 |
| 5,243,247 | 9/1993 | Schmidt | 310/239 |
| 5,319,277 | 6/1994 | Materne et al. | 310/239 |

FOREIGN PATENT DOCUMENTS

| | | |
|---|---|---|
| 8400645 | 2/1984 | European Pat. Off. |
| 1932292 | 12/1965 | Germany |

*Primary Examiner*—Mark O. Budd
*Attorney, Agent, or Firm*—Morgan & Finnegan

[57]   ABSTRACT

The invention relates to a brush holder plate for an electric current commutating motor. The brush holder plate comprises axial projections which guide and orientate the brush holder plate during its introduction into the casing by cooperation with stops on the casing. Spiral return springs for the brushes are identical and are located in different planes to exert appropriate thrust on the respective brushes.

5 Claims, 2 Drawing Sheets

BRUSH HOLDER PLATE FOR A DIRECT CURRENT ELECTRIC COMMUTATING MOTOR AND AN ELECTRIC MOTOR EQUIPPED THEREWITH

FIELD OF THE INVENTION

The present invention relates to a brush holder plate for an electric commutating motor.

It also relates to an electric motor using the brush holder plate of the invention.

BACKGROUND OF THE INVENTION

In the prior art, devices formed by brushes which slide in housings or grooves carried by a brush holder plate are known.

The carbons or brushes are applied by springs against the surface of a commutator mounted on a rotating shaft connected to the rotor of the motor, which passes through a bore in the plate.

The plate comprises strip conductors, for example, and possibly electrical components, and also a connector to an electricity supply cable.

In the prior art, such plates are formed by an insulating plate on which are disposed conductive components and also the various components described above.

Because of the plane nature of the plate, a problem is encountered when performing the assembly of the plate onto the casing of the electric motor.

In fact, the plate bearing the brushes or carbons has to be appropriately orientated in relation to the electric and/or magnetic axis of the motor. Furthermore, the position assumed by the plate along the axis of the rotor has to correspond to an optimal contact position between the brushes and the commutator.

In particular, during the assembly of the brush holder plate, a certain number of tests have to be performed to decide the right-left orientation in relation to an axis, a plane or a winding direction, etc.

These operations are expensive in assembly time and there is the risk of errors which are translated, for large scale production, into a certain reject rate.

SUMMARY OF THE INVENTION

According to a first aspect of the invention, means are provided which provide for the guided introduction of the plate into the casing, and for the brush holder plate to be located, in a certain manner, both in an axial and in an angular orientation.

According to another feature of the invention, the components used to apply the brushes against the commutator are formed by helical springs disposed on the same side of the brushes in relation to a plane.

In the prior art, springs having different winding directions are provided.

The invention avoids the necessity of using two spiral springs having opposed spiral pitches by proposing a method of mounting the brush holder plate on either side of the reference plane.

Other components and characteristics of the present invention will be better understood by studying the description and attached drawings.

DETAILED DESCRIPTION OF THE PREFERRED EMBODIMENT

Figure 1:
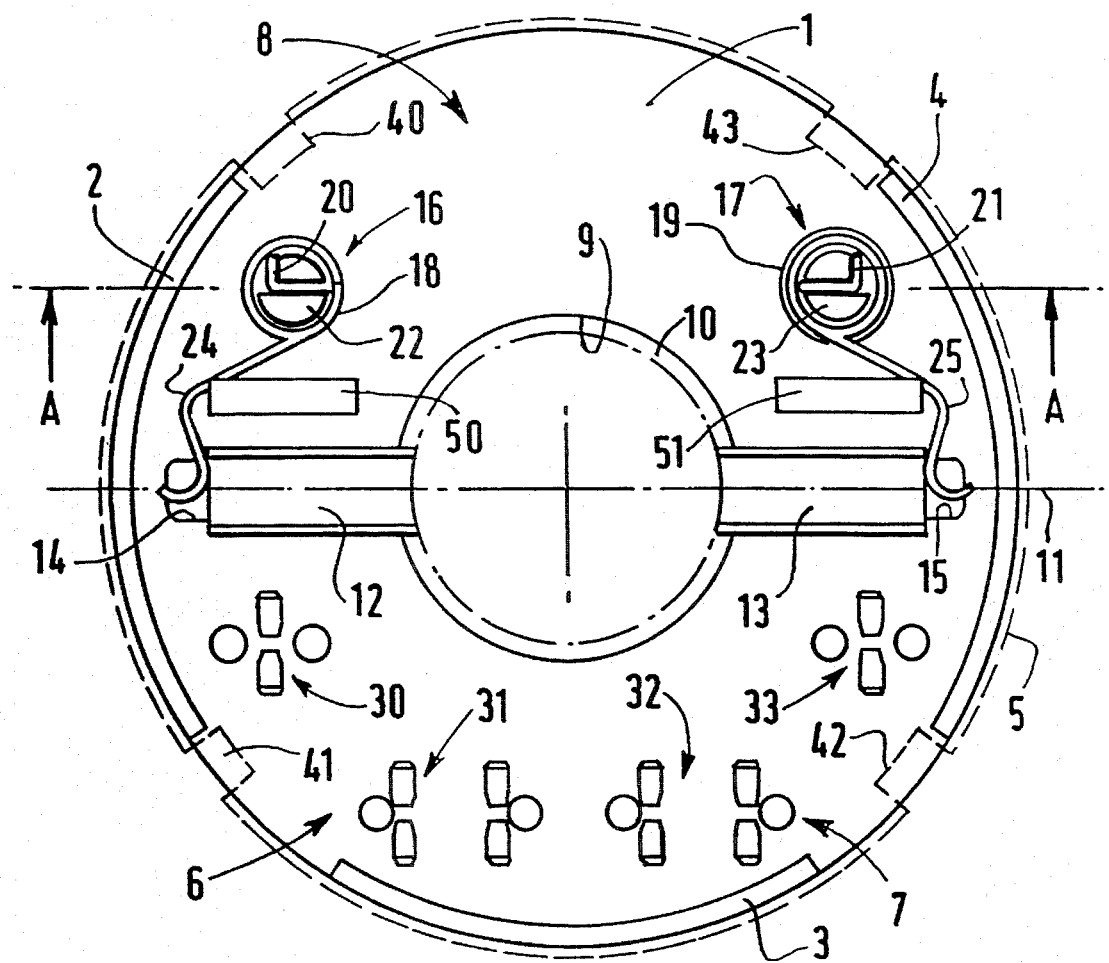
FIG. 1 is a front view of a plate with the casing of the motor being shown.

FIG. 1 shows a front view of a brush holder plate with the outline of the motor casing indicated by broken lines.

The brush holder plate 1 is formed by a main body in the form of a disc 1 having axial projections in the form of cylindrical extensions 2, 3, 4 intended to locate along cylindrical generating lines of the casing 5, shown by broken lines.

In a preferred embodiment, the projections 2, 3 and 4 form part-cylindrical arcuate segments which are separated by apertures 6, 7 and 8 respectively and which are distributed with an irregular arrangement of the angular positions in relation to the centre of the disc 1.

In the centre of the disc part 1, a bore 9 is provided through which the commutator 10 extends.

Two brushes, 12 on the left and 13 on the right, slide in grooves 14 and 15 on the left and right respectively, and are aligned along the axis 11.

The brushes 12 and 13 are in permanent contact with the commutator when it is installed and are applied against it by springs 16, 17 on the left and right respectively.

Springs 16 and 17 comprise spiral springs formed by a set of turns forming cylinders 18 and 19 respectively, a first end 20 or 21 respectively of which is fixed in a hole provided in a pillar 22 and 23 respectively and a second end 24 and 25 respectively forming an arm engaging the free end of the associated brush 12 or 13.

FIG. 1 shows holes 30 to 33, which enable the electrical connection and the mechanical attachment of various electrical components provided on the plate and which are in particular a contactor and fuses.

The casing 5 has stops 40, 41, 42 and 43 respectively which are disposed on the inner peripheral wall. The stops are shaped firstly to enable the plate to be located in an appropriate position along the axis of the rotor in relation to the commutator and secondly to enable an appropriate orientation of the brush holder plate in relation to the electric or magnetic axis of the electric motor.

Each stop has a face in contact with the disc of the brush holder plate, close to its periphery, on the face which is shown in FIG. 1. It also has sides which come into contact with the opposite edges of the axial projections 2, 3, 4. These sides maintain the angular orientation of the brush holder plate relative to the axis of the electric motor (the axis of the rotor) during the lifetime of the motor. Moreover, as a result of the irregular arrangement of the three axial projections 2, 3, 4, an orientating means is provided for the introduction of the plate through the aperture in the casing of the motor.

The above-mentioned contact faces of the four stops 40 to 43 define the plane in which the brush holder plate is located and this plane is located in relation to the space which the commutator of the rotor occupies after assembly.

The stops may be formed by metal plates glued or welded onto the appropriate face of the casing 5. They may also be obtained by moulding, depending on the nature of the casing.

In other embodiments they are produced by local drawing by means of a punch, from the other face of the casing, in particular before rolling the sheet metal which forms the cylindrical casing. A stop may also assume the appearance of a blade, the free edge of which forms the contact face of the stop with the plate.

In an embodiment, the four stops 40–43 are disposed symmetrically in relation to the axis 11 and its perpendicular axis, whereas the cylindrical sectors 2–4 on the plate are not distributed equally in the four quadrants. For this reason, not only an orientation means for the plate is provided, but an angular correcting means is provided to prevent disposing the plate with an error of 90°.

Finally it will be noted that the arms 24 and 25 of the springs engage beneath guides 50 on the left and 51 on the right respectively, which are mounted on the plate parallel to the direction of the brushes.

For this reason, during the lifetime of the brushes in which their length is reduced, the spring arm is always controlled by the corresponding guide, even in the event of vibrations or shocks.

Figure 2:
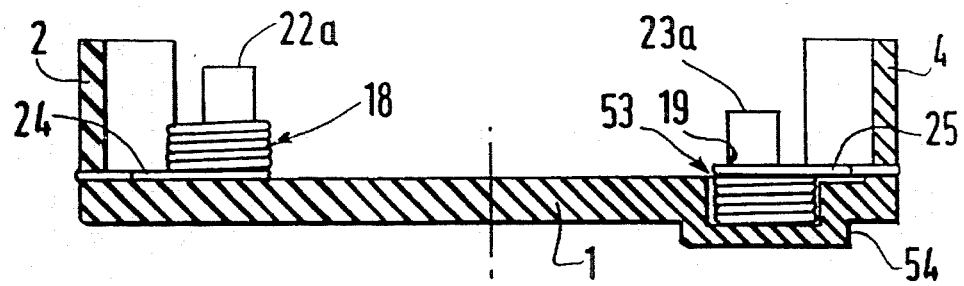
FIG. 2 is a section along line A—A of the plate of FIG. 1.

FIG. 2 shows a section along line A—A of FIG. 1 which passes through the axis of symmetry of the pillars 22 and 23. This also shows in section the part cylindrical projections 2 and 4 which are connected to the disc 1 of the plate. This figure also shows the half-pillars 22a, 23a, which are truncated so as to prevent the bent part 20 of the free end of the spiral spring 18 or 19 from rotating when a force is exerted on the other free arm of the spring. The other half-pillar is visible in FIG. 1 for each pillar 22, 23.

According to a second aspect of the invention, it will be noted that in the arrangement in FIG. 1 the spring means for the brushes are disposed on the same side of the axis of symmetry of the brushes 11.

With this arrangement, one of the springs 18 thrusts from the left towards the right, whereas the other spring 19 thrusts from the right to the left in relation to the axis 11. For this reason, if the symmetry is retained in relation to the axis perpendicular to axis 11, it is necessary to have two springs 18 and 19 having mutually opposed winding directions.

Because of this, the hooked parts are no longer symmetrical and it is absolutely necessary to personalise each hooked side so as to guarantee a proper assembly of the springs. This operation requires the assembly operator to supervise the positioning of the correct springs in the correct sites, which is a time-consuming exercise.

To provide a solution to this problem, the preferred embodiment of the invention proposes disposing the two springs so that they are also symmetrical to the plane occupied by disc 1 of the brush holder plate.

For this reason, the first spring 18 is shown on the upper face of the disc, whereas the second spring to the right 19 has been installed in a seat 53 made below the general plane of the disc 1 so that the spring 19 has its end 25 in the same plane, but to the right, as the end 24 of spring 18.

With this arrangement the two springs urge the brushes in the appropriate direction.

Figure 3:
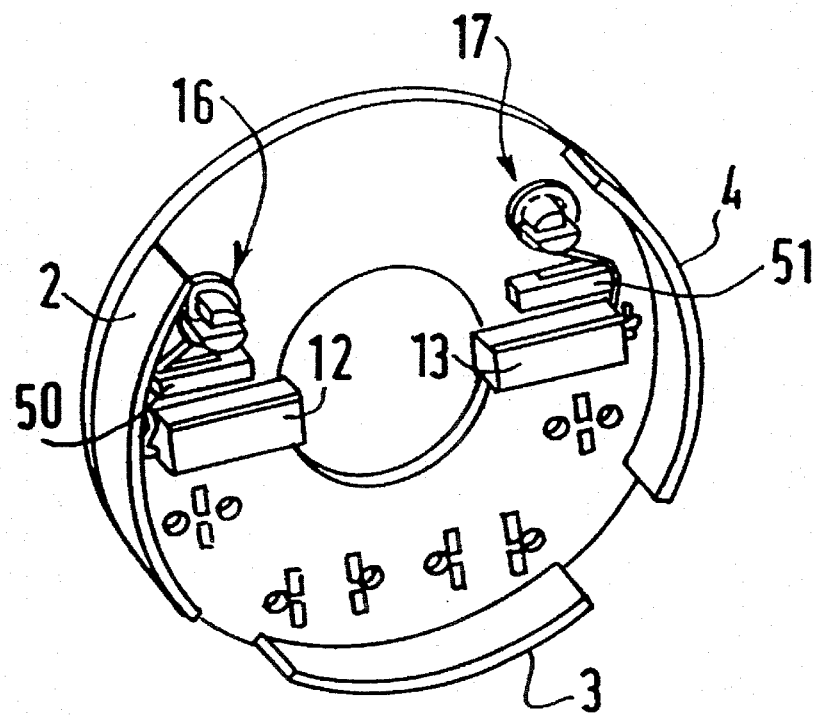
FIG. 3 is a perspective view of the plate shown in FIG. 1.

FIG. 3 shows a perspective view of the plate shown in FIGS. 1 and 2. The same components bear the same reference numbers and will not be described in further detail.

It will be noted from FIGS. 2 and 3 that the cavity for the seat 53 results in a single thickness 54 on the other face of the disc 1 of the brush holder plate.

Figure 4:
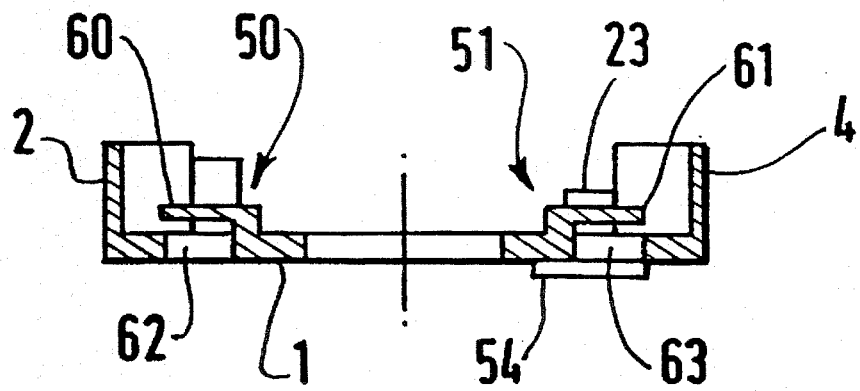
FIG. 4 is a sectional view along another sectional plane of the plate shown in FIG. 1.

FIG. 4 shows a section taken along an axis passing through guides 50 and 51. Guides 50 and 51 are formed by lugs 60 and 61 respectively which are located above apertures 62 and 63 respectively.

FIG. 4 also shows the protuberance 54 produced by the seat 53 for locating the spring 19.

Lugs 60 and 61 are obtained by moulding an insulating plastic material.

It should be noted that projections 2, 3, 4 provide mechanical protection during assembly for the connecting braids (not shown) which electrically connect the brush to the electrical components mounted on the brush holder plate.

In fact, the connecting braid has to be long enough to allow the displacement of the brush in its seat during its lifetime.

For this reason, during introduction, the unused part of the braid is large and forms a loop which may become jammed between the casing and the edge of the plate. The presence of axial projections 2, 3 and 4 enables this contact to be prevented.

Furthermore, the presence of axial projections 2 to 4 facilitates the introduction of the brush holder plate during assembly into the aperture in the casing as it is then guided during its passage into the aperture. For this purpose the axial projections may be provided with a slight inclination to give the appearance of truncated cone sections, the diameter of the free end of which is smaller than that of the end connected to the disc of the plate.

The horizontal projections may be obtained by moulding an insulating material which has good thermal properties.

They may also be obtained by bending the material of the plate at 90° where the plate is stamped from a suitable material.

What is claimed is:

1. A brush holder plate of the kind having at least two brushes disposed along an axis and in which the brushes are urged towards a commutator by elastic means comprising spiral springs disposed on the same side in relation to the axis, wherein the springs are formed by identical turns having the same winding direction and are located on either side of the plane surface of the disc of the brush holder plate so that the ends of the spiral springs each rest on the brushes in the direction of the support of the two sides on the commutator.

2. A brush holder plate of the kind having at least two brushes disposed along an axis and in which the brushes are urged towards a commutator by elastic means comprising spiral springs disposed on the same side in relation to the axis, wherein the springs are formed by identical turns having the same winding direction and are located on either side of the plane surface of the disc of the brush holder plate so that the ends of the spiral springs rest on the brushes in the direction of the support of the two sides on the commutator, one of the springs being disposed above the plate and the other spring being disposed in a seat beneath the plane of the plate surface.

3. A plate according to claim 2, wherein the ends of the spiral springs are located and guided by guide members.

4. A plate according to claim 3, wherein the guide members are formed by lugs formed opposite apertures in the plate.

5. An electric commutating machine having a casing with stops formed on a face thereof, the machine incorporating a brush holder plate, the brush holder plate comprising axial projections which are adapted to be guided on the stops provided on the electric commutating machine casing face, at least two brushes disposed along an axis and in which the brushes are urged towards the commutator spiral springs for urging the brushes, each of the springs being disposed on the same side in relation to the axis, wherein the springs are formed by identical turns having the same winding direction and are located on either side of the plane surface of the brush holder plate so that the ends of the spiral springs rest on the respective brushes in the direction of the support of the two sides on the commutator.

* * * * *